July 12, 1938.  P. F. ROSSMANN  2,123,315
MOTOR VEHICLE
Filed Feb. 26, 1934  2 Sheets-Sheet 1
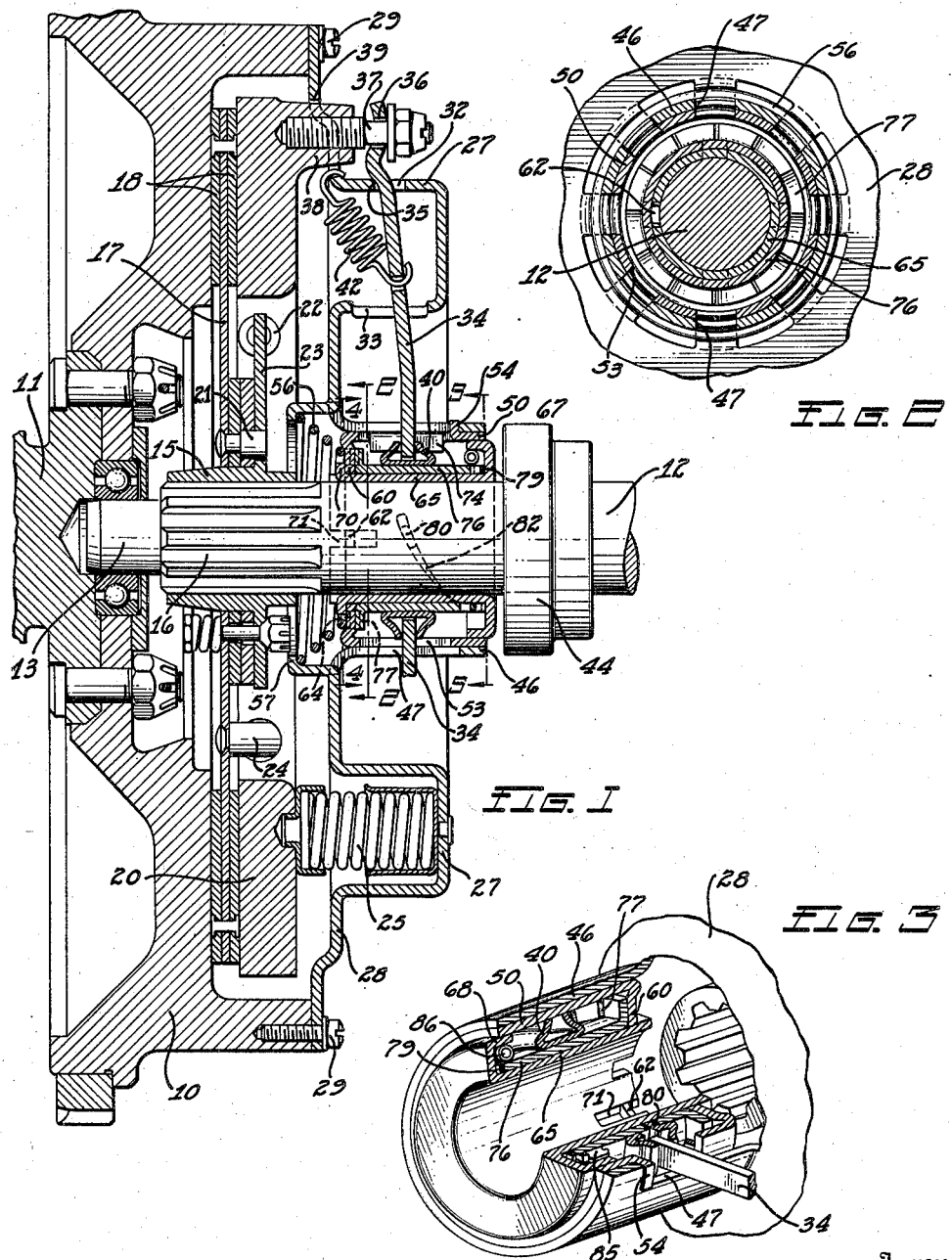
Inventor
PETER F. ROSSMANN.

Inventor
PETER F. ROSSMANN.
By Watson, Coit, Morse & Grindle
Attorney

Patented July 12, 1938

2,123,315

UNITED STATES PATENT OFFICE 2,123,315

MOTOR VEHICLE

Peter F. Rossmann, Detroit, Mich., assignor to Packard Motor Car Company, Detroit, Mich., a corporation of Michigan Application February 26, 1934, Serial No. 713,054

5 Claims. (Cl. 192—111)

This invention relates to improvements in mechanism for controlling the operation of motor vehicles and more particularly to control mechanism for the vehicle clutch.

Clutch operation is ordinarily effected by manipulation of an operating element comprising a pedal projecting through the vehicle floorboard, this pedal being connected with the clutch by linkage whereby depression of the pedal serves to release or disengage the cooperating parts of the clutch to discontinue the drive from the motor to the vehicle wheels. It has heretofore been proposed to provide clutch or brake operating mechanisms with means for taking up slack resulting from wear of the cooperating parts of the linkage connecting the brake or clutch pedal with the operating element. It is found, however, that while it is a relatively simple matter to eliminate lost motion in a control mechanism by suitable slack take-up devices, one of the principal difficulties encountered is due to wear of the cooperating clutch parts, for instance, the friction facings of the clutch. Wear of the clutch facings has the same effect as shortening the linkage connecting the clutch pedal with the movable clutch element and thus the clutch is disengaged by depressing the clutch pedal through a smaller range of movement and on releasing the clutch pedal to engage the clutch, the pedal is caused to rise to a greater extent. Thus, it frequently happens that when the clutch pedal is released it will rise and engage the underside of the floorboard or a stop provided for that purpose before the cooperating parts of the clutch have firmly engaged, and unnecessary wear of the clutch facings and other difficulties incident to incomplete engagement of the cooperating clutch parts result.

It is therefore a feature of the present invention to provide means whereby the range of movement of the clutch pedal or the position of the clutch pedal when the clutch is engaged to drive the vehicle is not substantially altered as the result of excessive wear of the cooperating clutch parts.

More specifically, it is the object of the invention to provide means engageable by the usual clutch throw-out bearing and connected with the clutch, whereby axial movement of the bearing effects release of the clutch, this means affording a certain degree of play or lost motion which is automatically maintained constant regardless of clutch wear. In a preferred form of the invention this means may comprise the usual clutch operating fingers and a device engaged by the fingers and surrounding the shaft on which the clutch throw-out bearing is supported, the device consisting of a sleeve having members which are relatively displaceable axially in response to clutch wear and which are maintained substantially in such relatively displaced relation until further wear occurs. Thus in effect the point of engagement between this device and the clutch fingers is displaced axially from time to time to an extent sufficient to maintain the clutch and its operating mechanism in proper operative relation.

From a broader aspect the invention contemplates the provision of a motion transmitting device affording mechanical connection between two or more elements which is so constructed as to automatically adjust the effective length of the connection in response to relative displacement of the connected elements as the result of wear.

Further objects and features of the invention will be apparent from the following description taken in connection with the accompanying drawings, in which Figure 1 is a longitudinal sectional view of a clutch showing the application of the invention to the operating mechanism therefor;

Figure 2 is a transverse sectional view taken substantially on the line 2—2 of Figure 1;

Figure 3 is a perspective view of certain of the parts shown in Figure 1 with the self-adjusting device broken away to illustrate the details thereof;

Figure 4:
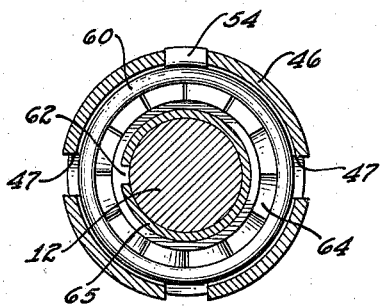
Figure 4 is a transverse sectional view taken substantially on the line 4—4 of Figure 1.

Figures 6 to 9 inclusive are perspective views, partly broken, of the principal elements of the self-adjusting device.

In the specification and in the accompanying drawings a specific embodiment of the invention is disclosed and this embodiment is described in detail. It will nevertheless be understood that the primary purpose of illustrating the invention by reference to a specific form thereof and by the employment of detailed language herein is to facilitate an understanding of the principles underlying the invention, and that the scope of the invention is not intended to be limited thereby.

Figure 1 discloses a flywheel 10 secured to the motor shaft 11 in the usual manner, and a driven shaft 12 journalled as shown at 13 in the flywheel and arranged to be coupled with and uncoupled therefrom by a clutch. The clutch may comprise the usual hub member 15 supported on the driven shaft 12 for rotation therewith and axial movement with respect thereto by the splined connection 16, this hub carrying a clutch disk 17 having a clutch facing or friction annuli 18 secured thereto and arranged for engagement with the rear face of the flywheel and with the forward face of an annular clutch plate 20, the plate 20 and disk 17 being journalled on the hub member and partaking of slight rotary movement with respect thereto which is resisted by coil springs 22 interposed between circumferentially spaced radial flanges 23 formed on the hub 15 and pins 24 supported by the disk 17, this yielding connection permitting the clutch to engage smoothly. The disk 17 and the flanges 23 of the hub 15 are connected for rotation by pins 21.

The clutch plate 20 is normally urged toward the flywheel 10 to clamp the disk 17 therebetween and thereby engage the clutch by means of coil springs 25 compressed between the plate 20 and the rear wall of an annular pressed-out portion 27 formed in a clutch cover plate 28, the latter being secured adjacent the periphery thereof to the flywheel 10 as indicated at 29. The disk 17 and clutch plate 20 thus constitute the movable elements of the clutch.

The portion 27 of the cover plate is apertured as indicated at 32 and 33 at one or more circumferentially spaced points to permit the passage therethrough of one or more clutch fingers or levers 34, each clutch finger being fulcrumed as at 35 on the wall defining the forward edge of the associated opening 32 and being recessed as at 36 adjacent the outer end thereof to receive a bolt 37 threaded into a boss 38 formed on the clutch plate 20 and extending rearwardly through an opening 39 in the clutch cover plate, the fingers being thus retained against circumferential displacement with respect to the clutch plate 20. A coil spring 42, acting between each clutch finger and the clutch cover plate 28 as shown in Figure 1 serves to retain the associated clutch finger in engagement with the fulcrum 35 therefor and with the head of the associated bolt 37. The inner end of each clutch finger 34 is received in a member 40 which is formed as shown more particularly in Figures 1, 3, and 8 to constitute a collar, the clutch fingers being somewhat loosely received between the outwardly directed flanges thereof. The member 40 constitutes one of the two members hereinbefore referred to as automatically and relatively displaceable and with the exception of this member, the structure thus far described is conventional and the operation thereof will be readily understood.

Thus whether the inner ends of the clutch fingers 34 are engaged with a collar as shown herein or whether these clutch fingers are positioned for direct engagement by the usual clutch throw-out bearing 44 slidable axially of the shaft 12, forward movement of the inner ends of the clutch fingers will rock these fingers about their fulcrums 35 on the clutch cover plate 28 and thus displace the bolts 37 and the clutch plate 20 to the rear against the action of the springs 25 to effect positive disengagement of the clutch. When the inner ends of the clutch fingers 34 are moved rearwardly or are released to permit such movement, the clutch will be again engaged by the springs 25. While the invention is particularly applicable to this type of clutch, it is not necessarily so restricted in its use, and limitation of the invention as regards the details of the clutch is not intended except where specifically defined in the claims appended hereto.

Secured to or formed integrally with the inner portion of the clutch cover plate 28 is a rearwardly directed sleeve 46 which is substantially cylindrical and which is provided with a plurality of axially extending slots 47, at least sufficient in number to permit the passage through the sleeve of each of the clutch fingers 34. A sleeve 50 fits within the sleeve 46 and is provided with a plurality of axially extending slots 53, corresponding to the slots 47 in the sleeve 46 to permit passage of the clutch fingers 34 therethrough, and is further provided with an outwardly directed tongue 54 preferably struck out from one of the slots 53, this tongue extending within one of the slots 47 in the sleeve 46 and to lock the two sleeves for unitary rotation and to limit the rearward movement of the sleeve 50. A coil spring 56 abutting at one end an inturned annular flange 57 on the clutch cover plate 28 and at the other end an inwardly directed flange 60 formed on the sleeve 50 serves to yieldingly maintain the latter in its extreme rearward position with the tongue 54 in engagement with the rearward end of the associated slot 47 in the sleeve 46, the spring 56 being preferably conical in shape to effect economy in space in an axial direction. The flange 60 is provided with an inwardly directed tongue 62 and with a plurality of circumferentially disposed and rearwardly directed ratchet teeth 64, the purpose of which will be hereinafter explained, these teeth being preferably struck out from the material of the flange 60.

Figure 6:
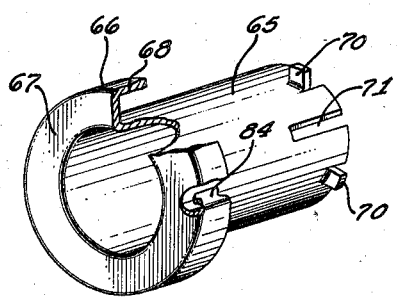
Figure 7:
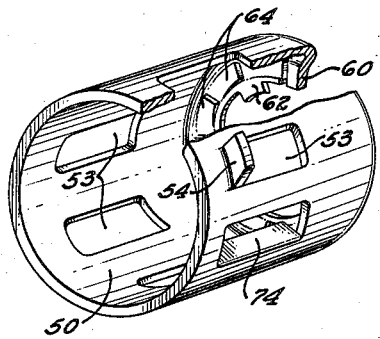
Figure 8:
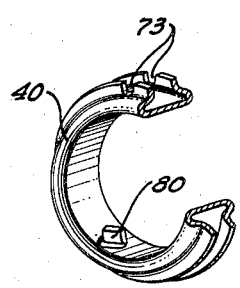

The sleeve 50 is supported on a sleeve 65, shown more particularly in Figure 6 of the drawings which is in turn received on the shaft 12, the fit being sufficiently loose to permit axial movement of the sleeve 65 on the shaft. At its rearward end the sleeve 65 is formed to provide a forwardly directed cup-shaped annulus 66 comprising a radial flange 67 and a substantially cylindrical flange 68, the sleeve 50 seating on the latter and also engaging the forward end of the sleeve 65 by means of the flange 60, so that the cylindrical portions of the sleeves 50 and 65 are maintained in spaced relation with the former surrounding the latter. At its forward end the sleeve 65 is provided with one or more radial tongues 70 struck up from the sleeve and maintained by means hereinafter described in engagement with the flange 60, the tongues 70 serving to limit rearward movement of the sleeve 65. The sleeve 65 is further provided with a longitudinally extending recess 71 within which is received the tongue 62 formed on the sleeve 50, and it will be apparent from the construction thus far described that by the provision of interlocking tongues and recesses the sleeves 46, 50, and 65 are locked against relative rotation. The member 40 is similarly locked against rotation with respect to the foregoing elements by means of recesses 73 formed in the periphery thereof and engaged by an inwardly directed axially extending tongue 74 formed on the sleeve 50, preferably of material struck inwardly from one of the slots 53.

Figure 9:
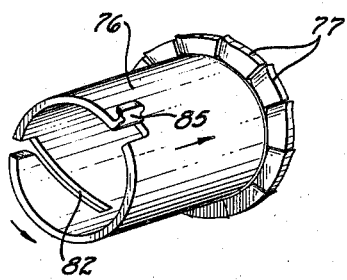

A sleeve 76, shown more particularly in Figure 9 of the drawings, is provided at one end with an outwardly directed flange which is slit and bent to form circumferentially disposed forwardly extending ratchet teeth 77 corresponding in number and configuration to the ratchet teeth 64 formed on the flange 60 of the sleeve 50. The sleeve 76 is telescoped on the sleeve 65 and is movable axially and rotatably thereon, the ratchet teeth 77 being maintained in engagement with the ratchet teeth 64 by means of a flat spring 79 interposed between the rearward end of the sleeve 76 and the flange 67 of the sleeve 65, this spring continually urging the sleeve 76 in a forward direction. The member 40 hereinbefore referred to is telescoped on the sleeve 76 and is provided with an inwardly directed tongue 80 engaging within a slot 82 formed in the sleeve 76, the slot 82 extending both circumferentially and axially of the sleeve 76 and being preferably spirally arranged, the tongue 80 being inclined to conform to the inclination of the slot 82.

It will be observed that the connection between the member 40 and the sleeve 76 is in the nature of a thread or an axial cam, relative rotation of these members resulting in relative axial displacement thereof. The degree and direction of inclination of the slot 82 preferably corresponds to that of the ratchet teeth 77 and 64; that is to say, the construction is such that if the sleeve 76 be rotated toward a position in which the ratchet teeth 77 and 64 are bottomed, engagement between these teeth being maintained by the spring 79, the member 40 will not be axially displaced although the sleeve 76 partakes of both rotary and axial movement.

Figure 5:
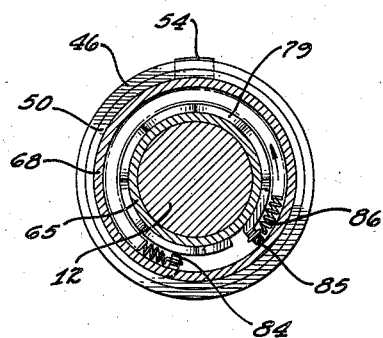
Figure 5 is a transverse section on the line 5—5 of Figure 1.

The axially directed flange 68 of the sleeve 65 is provided with an inwardly extending lug 84 and the sleeve 76 is provided with a similar outwardly directed lug 85, a coil spring 86 normally under tension being secured at its ends to these lugs, whereby the sleeve 76 is continually urged in a direction in which the ratchet teeth 77 lock or are bottomed with the ratchet teeth 64, or in the direction of the arrows in Figures 5 and 9.

The mode of operation will be apparent from the foregoing description. The clutch throw-out bearing 44 which is adapted to be displaced to the left as shown in Figure 1 on the shaft 12 by suitable clutch operating mechanism, not shown, is preferably spaced from the flange 67 at the rear of the sleeve 65 when such mechanism is released and the clutch is engaged, this spacing affording the usual slight amount of play or lost motion necessary to ensure complete engagement of the cooperating clutch parts. As the clutch throw-out bearing 44 is moved to the left into engagement with the flange 67 on the sleeve 65 and as this movement is continued, the sleeve 65 is displaced to the left, first compressing the spring 79 and thereafter moving the sleeve 76, this movement being transmitted to the member 40 and thence to the clutch fingers 34 through the medium of the tongue and slot connection 80, 82, the sleeve 76 being retained against rotation with respect to the remaining elements of the device by the interlocking ratchet teeth 64 and 77. When the operating mechanism, including the usual clutch pedal, is released to engage the clutch, the parts will return to their initial position in which they are shown in Figure 1.

As the clutch facing 18 wears, the clutch plate 20 will move further to the left when the clutch is engaged, this increased movement resulting in corresponding displacement of the inner ends of the clutch fingers 34 to the right. This displacement of the clutch fingers 34 is in turn communicated to the member 40 and thence through the tongue and slot connection 80, 82 to the sleeve 76, the spring 79 being further compressed as the clutch is released. It will be observed that regardless of this wear, the clearance between the clutch throw-out bearing 34 and the flange 67 on the sleeve 65 is not disturbed, the latter being restored by the action of the spring 56 each time the clutch is engaged to its extreme rearward position as limited by the engagement of the tongue 54 with the rearward end of the slot 47, it being understood that the flat spring 79 is relatively weak and offers little resistance to the rearward movement of the clutch fingers 34 and associated parts in response to the action of the clutch springs 25.

When the wear on the clutch facing 18 is sufficient on engagement of the clutch to move the sleeve 76 to the right through a distance equal to the depth of the ratchet teeth 77 and 64, these teeth will clear, and the coil spring 86 will be permitted to rotate the sleeve 76 in the direction of the arrows in Figures 5 and 9 through a distance equal to one ratchet tooth space, the succeeding ratchet teeth engaging to lock the sleeve 76 against further rotation pending further wear of the clutch facing 18 and repetition of the adjustment just described. While the sleeve 76 is rotating, the ratchet teeth 77 slide down the inclined faces of the corresponding teeth 64, engagement being maintained therebetween by the action of the spring 79, and no axial displacement of the member 40 is effected owing to the similar inclination of the faces of the ratchet teeth and the slot 82 in the member 76 as hereinbefore explained. It is, of course, essential that sufficient clearance be provided between the rearward end of the sleeve 76 and the flange 67 on the sleeve 65 both to accommodate the spring 79 and to permit the axial movement of the sleeve necessary to clear the ratchet teeth 77 and 64. In this manner the member 40 is continually advanced to the right as the clutch facings wear, whereas the axial position of the remaining parts of the device is not disturbed and the lost motion in the clutch operating mechanism remains substantially constant.

It will be observed that the several elements of the self-adjusting device may be made of sheet metal pressed or stamped into the necessary form, the expense of forming and assembling these members being thus reduced to a minimum. The manner in which these elements are fitted together is obvious from an inspection of Figures 3 and 6 to 9, it being only necessary to bend up the lug 85 after the member 40 is assembled on the sleeve 76, and to bend up the tongues 70 after the sleeves 50 and 76 and associated parts have been assembled on the sleeve 65, this structure being then introduced within the sleeve 46 through the forward end of the latter and retained in position by the insertion of spring 56. As thus constructed the device may be readily applied with a minimum of alteration to any conventional clutch.

Obviously the structure herein described can be employed to effect engagement rather than release of the clutch, the gist of the invention residing in a motion transmitting member of which the length is automatically variable, or more specifically, in a device for automatically altering the point of engagement of the usual clutch fingers with an axially displaceable member for operating the same. Various modifications of the structure are therefore possible within the scope of the invention as defined in the appended claims.

What I claim is:

1. In a wear compensating, motion transmitting device, the combination with a pair of relatively displaceable members, of means operable automatically to relatively displace said members and to retain said members substantially in such displaced relation, said means comprising devices retaining said members against relative rotation, an element rotatable with respect to said members and having an axial cam connection with the first one of said members and a ratchet connection with the second one of said members, and yielding means urging said element to rotate with respect to said members in opposition to said ratchet connection and to move axially to maintain said ratchet connection, whereby axial movement of the first one of said members to an extent sufficient to disengage said ratchet connection will effect rotation of said element to displace said cam connection axially.

2. In a clutch operating mechanism, the combination with a shaft having a movable clutch element associated therewith, of generally radially extending clutch fingers connected with said element for operation thereof, a sleeve axially displaceable on said shaft in one direction to operate said clutch, means limiting movement of said sleeve in the opposite direction, and an operative connection between said sleeve and said fingers automatically displaceable in said opposite direction in response to clutch wear to compensate for such wear, said operative connection including a member engaging said fingers and having a non-rotatable engagement with said sleeve, an element rotatable and axially displaceable with respect to said sleeve said element having an axially directed ratchet connection with said sleeve and an axial cam connection with said member, and yielding means acting between said sleeve and element tending to maintain said ratchet engagement and to rotate said element in opposition to said ratchet connection.

3. In a motion transmitting, wear compensating device, the combination with a shaft, of a sleeve on said shaft, a member displaceable axially of the shaft by said sleeve, an operative connection between said sleeve and member operable automatically to displace the same relatively in an axial direction to compensate for wear, said connection including means affording a non-rotatable engagement between said member and said sleeve, an element rotatable and axially displaceable with respect to said sleeve said element having an axially directed ratchet connection with said sleeve and an axial cam connection with said member, and yielding means acting between said sleeve and element tending to maintain said ratchet engagement and to rotate said element in opposition to said ratchet connection.

4. In clutch control means, the combination with an axially displaceable clutch throwout bearing, of an axially displaceable device so positioned when the clutch is engaged that axial clearance is provided between said bearing and said device, means operatively connecting said device and said clutch, means positively limiting movement of said device toward said bearing to maintain constant clearance therebetween, and means incorporated in said device and responsive to clutch wear to vary in accordance with such wear the range of movement of the movable clutch element.

5. In a clutch operating mechanism, the combination with a shaft having a movable clutch element associated therewith, of generally radially extending clutch fingers connected with said element for operation thereof, a member axially displaceable on said shaft in one direction to operate said clutch, means positively limiting movement of said member in the opposite direction, and an operative connection between said member and said fingers automatically displaceable in said opposite direction in response to clutch wear to compensate for such wear.

PETER F. ROSSMANN.